US009336942B2

(12) United States Patent
Yamada et al.

(10) Patent No.: US 9,336,942 B2
(45) Date of Patent: *May 10, 2016

(54) REACTOR, CONVERTER, AND POWER CONVERSION DEVICE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Yukinori Yamada, Yokkaichi (JP); Atsushi Ito, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/436,223

(22) PCT Filed: Oct. 23, 2013

(86) PCT No.: PCT/JP2013/078745
§ 371 (c)(1),
(2) Date: Apr. 16, 2015

(87) PCT Pub. No.: WO2014/069312
PCT Pub. Date: May 8, 2014

(65) Prior Publication Data
US 2015/0287525 A1    Oct. 8, 2015

(30) Foreign Application Priority Data
Nov. 1, 2012    (JP) .................. 2012-242225

(51) Int. Cl.
*H01F 27/02*    (2006.01)
*H01F 27/40*    (2006.01)
(Continued)

(52) U.S. Cl.
CPC .............. *H01F 27/402* (2013.01); *H01F 27/02* (2013.01); *H01F 27/24* (2013.01);
(Continued)

(58) Field of Classification Search
CPC ............................................ H01F 27/00–27/30
USPC ............ 336/65, 83, 90, 92, 96, 196, 198, 192
See application file for complete search history.

(56) References Cited

U.S. PATENT DOCUMENTS

| | | | | |
|---|---|---|---|---|
| 5,463,522 A | * | 10/1995 | Van Wagener | ........ H01F 27/402 361/103 |
| 6,326,879 B1 | * | 12/2001 | Hangmann | .......... H01H 37/043 310/68 C |
| 6,958,579 B2 | * | 10/2005 | Sokoly | .................... H05B 41/18 315/219 |
| 2013/0314964 A1 | * | 11/2013 | Yoshikawa | .............. H01F 37/00 363/131 |

FOREIGN PATENT DOCUMENTS

| | | |
|---|---|---|
| JP | 2007-173702 A | 7/2007 |
| JP | 2009-109437 A | 5/2009 |

(Continued)

OTHER PUBLICATIONS

Nov. 26, 2013 International Search Report issued in International Application No. PCT/JP2013/078745.

*Primary Examiner* — Tuyen Nguyen
(74) *Attorney, Agent, or Firm* — Oliff PLC

(57) ABSTRACT

A reactor that includes a coil with a pair of coil elements connected to each other, a magnetic core with a pair of interior core portions disposed inside the coil elements and an exterior core portion which connects the interior core portions to form a closed magnetic path, and an insulator interposed between the coil and the magnetic core.

6 Claims, 6 Drawing Sheets

(51) Int. Cl.
*H01F 37/00* (2006.01)
*H01F 27/24* (2006.01)
*H01F 27/28* (2006.01)
*H02M 3/158* (2006.01)
*H02M 3/155* (2006.01)

(52) U.S. Cl.
CPC ........... *H01F 27/2823* (2013.01); *H01F 37/00* (2013.01); *H02M 3/158* (2013.01); *H01F 2027/406* (2013.01); *H02M 3/155* (2013.01)

(56) References Cited

FOREIGN PATENT DOCUMENTS

| | | |
|---|---|---|
| JP | 2010-245458 A | 10/2010 |
| JP | 2012-114302 A | 6/2012 |
| JP | 2012-189555 A | 10/2012 |
| JP | 2012-191172 A | 10/2012 |
| JP | 2012-212708 A | 11/2012 |
| WO | 2012/114890 A1 | 8/2012 |

* cited by examiner

REACTOR, CONVERTER, AND POWER CONVERSION DEVICE

This is a national phase application of PCT/JP2013/078745 filed on Oct. 23, 2013. This application claims priority to Japanese Application Number JP2012-242225, which was filed in the Japanese Patent Office on Nov. 1, 2012. The entire contents of which are incorporated by reference herein.

BACKGROUND

The present disclosure relates to reactors that are utilized as component parts of power conversion devices such as onboard DC-DC converters to be installed in vehicles such as hybrid automobiles and the like. In particular, the present disclosure relates to reactors capable of holding sensors, which are utilized for measurement of physical quantities (temperature, electric current and the like) during operation of the reactors, at suitable positions.

A reactor is employed as a part of a circuit for boosting or stepping down an electric voltage. For example, JP 2010-245458A discloses a reactor utilized for converters installed in vehicles such as hybrid automobiles. The reactor is provided with a coil having a pair of coil elements, an annular magnetic core in which the coil is disposed and which constitutes a closed magnetic path, a case accommodating an assembly of the coil and the magnetic core, and an encapsulating resin (secondary resin portion, potting resin) filled within the case.

When the coil is heated by electrical connection, a loss of the reactor is increased by the heat generation. The reactor is generally used after fixing it to an object to which it is to be installed, such as a cooling base for cooling the coil. It is conceivable that, while the reactor is utilized, a sensor for measurement of a physical quantity such as temperature or electric current of the coil is disposed in proximity to the reactor, for the purpose of controlling the electric current flowing to the coil according to the measured temperature and the electric current.

JP 2010-245458A discloses a reactor, in which a sensor is disposed between coil elements in a direction perpendicular to both of the direction in which the two coil elements are lined up and the axial direction of the coil elements. JP 2012-191172A discloses a reactor in which each coil element has an end surface shaped to have rounded corner portions with rounded corners, and a sensor is disposed in a trapezoidal shaped space which is interposed between the rounded corner portions of the coil elements and extends along an axial direction of the coil. This reactor is provided with an insulator interposed between the coil and a magnetic core. The insulator is unified to a sensor holding portion which presses a temperature sensor towards the coil side.

SUMMARY

In the reactor of JP 2010-245458A, it is necessary to provide at least clearance corresponding to the thickness of the sensor between coil elements. If the dimension of the clearance is substantially equal to the thickness of the sensor, the coil elements are caused to thermally expand by the heat generation and are pressed against the sensor, possibly damaging the sensor. In particular, in the region interposed between interior core portions in the coil elements, there is substantially no space for absorbing the thermal expansion of the coil elements, and the pressing force due to the thermally expanded coil elements tends to be applied on the sensor. Therefore, it is necessary to further increase the dimension of the clearance, so as to reduce the stress (pressing force from the coil elements) applied on the sensor, or to substantially eliminate the applied stress, making it difficult to miniaturize the reactor.

In the reactor of JP 2012-191172A, the sensor is disposed in the trapezoidal space in which substantially no pressing force from the two coil elements is applied. A configuration for stably maintaining this arrangement is desired. In the reactor of JP 2012-191172A, the sensor holding portion is integrally formed with the insulator, and a space for inserting the sensor into the trapezoidal space is small. Therefore, the coil and so on may interfere with the sensor while the sensor is assembled to the sensor holding portion, making its assembly difficult. In addition, for the purpose of assembling the sensor to the sensor holder, it is necessary to incline the sensor to some extent in relation to the axial direction of the coil and there is limitation in the length of the sensor holding portion along the axial direction of the coil. Therefore, a part of the sensor is not covered with the sensor holding portion, possibly causing the sensor to be detached. In addition, in the portion of outer circumference of the sensor not covered with the sensor holding portion, the sensor may not be securely held to the coil at an adequate position.

The present disclosure according to an exemplary aspect provides a reactor which can hold a sensor for measurement of a physical quantity during operation of the reactor at an adequate position, and makes it possible to easily assemble the sensor at the position. The present disclosure according to another exemplary aspect provides a converter provided with the above reactor, and a power conversion device provided with this converter.

The reactor of the present disclosure includes a coil with a pair of coil elements connected to each other, a magnetic core with a pair of interior core portions disposed inside the coil elements and an exterior core portion which connects the interior core portions to form a closed magnetic path, and an insulator interposed between the coil and the magnetic core. The reactor is provided with a sensor for measurement of a physical quantity during operation of the reactor, and a sensor holder which includes a member independent from the insulator and holds the sensor. Each coil element of the plurality of coil elements has a tubular body formed by spirally winding a wire and has an end surface shaped to have rounded corner portions with rounded corners, and the coil elements are disposed in parallel such that axes of the coil elements are aligned in parallel to each other. The sensor is disposed in a trapezoidal space interposed between the rounded corner portions which are disposed to face each other in the coil elements.

The reactor of the present disclosure can hold the sensor for measurement of a physical quantity (temperature of coil and so on) during operation of the reactor at an adequate position, and is compact.

BRIEF DESCRIPTION OF THE DRAWINGS

FIG. 4(A) is a perspective view. FIG. 4(B) is a cross-sectional view along B-B in FIG. 4 (A).

DETAILED DESCRIPTION OF THE EMBODIMENTS

Figure 1:
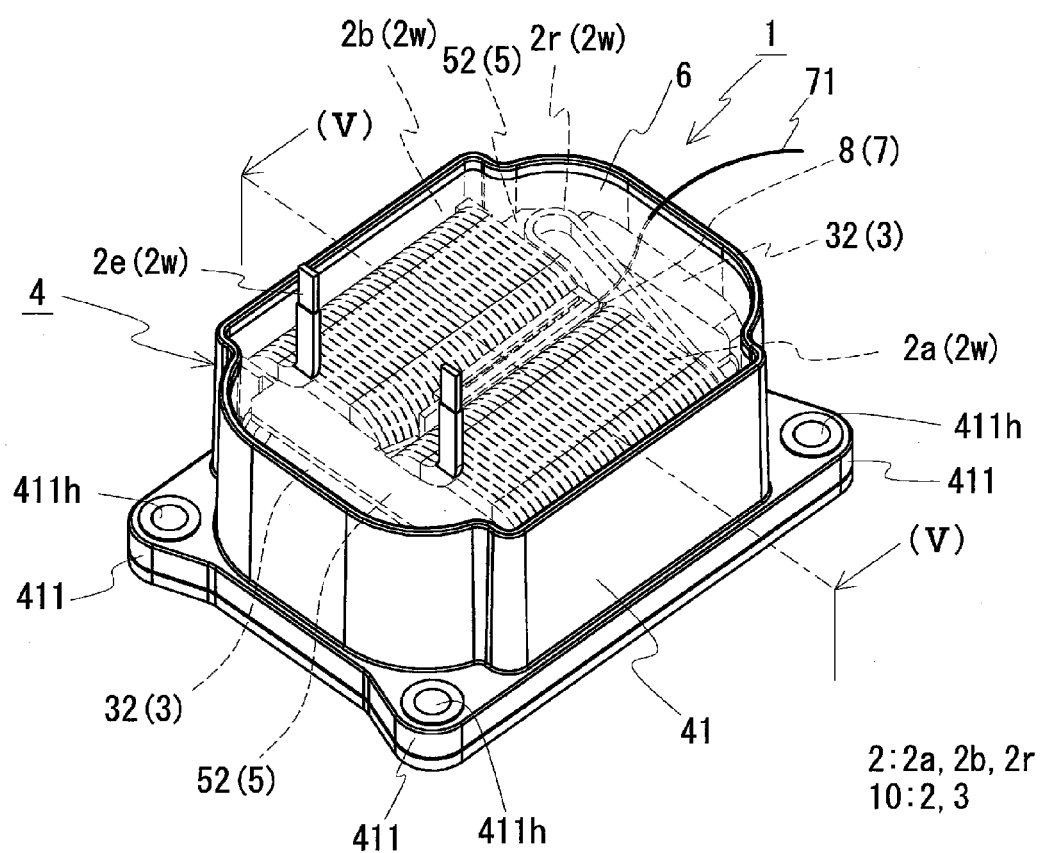
FIG. 1 is a schematic perspective view showing a reactor according to a first embodiment.

Explanation of Embodiments of the Present Disclosure

The present disclosure accomplishes the above-mentioned object by forming each coil element into a particular shape, disposing a sensor for measurement of a physical quantity (temperature, electric current of the coil and the like) during operation of the reactor at a particular position, and providing a member holding a sensor independently from an insulator. First, embodiments of the present disclosure will be listed below.

(1) The reactor according to the embodiment is provided with a coil having a pair of coil elements connected to each other, a magnetic core having a pair of internal core portions disposed inside the coil elements and an external core portion which connects the interior core portions with each other to form a closed magnetic path, an insulator interposed between the coil and the magnetic core. Moreover, the reactor is provided with a sensor for measurement of the physical quantity during operation of the reactor, and a sensor holder which includes a member independent from the insulator and holds the sensor. Each coil element of the pair of coil elements has a tubular form which is formed by spirally winding a wire and has an end surface shaped to have rounded corner portions with rounded corners. The coil elements are disposed in parallel such that axes of the coil elements are arranged in parallel. The sensor is disposed in a trapezoidal space interposed between the rounded corner portions which are disposed to face each other in the coil elements.

In the reactor according to this embodiment, even when both coil elements are aligned such that the regions interposed between the interior core portions are arranged close to each other in the paired coil elements, the trapezoidal space has a sufficient size fitted to curvatures of the rounded corner portions, making it possible to dispose the sensor sufficiently. That is to say, when the sensor is disposed in the trapezoidal space, it is possible to set the clearance between both coil elements smaller than the thickness of the sensor, thus minimizing the reactor. Moreover, the trapezoidal space is a so-called dead space needed for winding the wire for the purpose of providing the rounded corner portion. The sensor is disposed in the above space, making it possible to utilize the dead space and therefore substantially preventing the reactor from being enlarged.

Moreover, in the reactor according to the embodiment, most parts of the trapezoidal space between the rounded corner portions is shifted from a region interposed between both interior core portions, making it possible to reduce the stress that is applied on the sensor by the coil element, and preferably not to apply any stress at all on the sensor, if the sensor is arranged in that space.

Furthermore, in the reactor according to the embodiment, the sensor holder is provided independently from the insulator, making it possible to assemble the sensor to the sensor holder in an individual process prior to assembling the sensor holder to the insulator. Therefore, it is possible to prevent the sensor from interfering with the coil or the like while the sensor is assembled to the sensor holder, and to easily dispose the sensor with superior productivity. In assembling the sensor to the sensor holder, it is possible to assure space for handling the sensor on the periphery of the sensor holder, and there is no need to tilt the sensor with respect to the space in the sensor holder for accommodating the sensor. Accordingly, a length of a portion (for example, a holding portion described below) of the sensor holder substantially extending along the sensor has a high degree of freedom, making it possible to hold the long ranged portion of the sensor at this portion, and therefore it is possible to select a length for securely holding the sensor to the coil at an appropriate position. Moreover, it is possible to select a length for allowing the sensor to securely come into contact with the coil.

As the sensor can be securely held to the coil at a suitable position, it is possible to appropriately measure the physical quantity such as the temperature and the electric current of the coil, which is an object to be measured, with high reliability of the measurement value. In case the reactor according to the embodiment is provided with the encapsulating resin, it is conceivable that an assembly of the coil and magnetic core is accommodated within the case, and the encapsulating resin is filled within the case, and then cured. In this case, the sensor is held by the sensor holder, making it possible to prevent the sensor from floating by the filled encapsulating resin and inhibit measurement at an inappropriate position for the coil.

(2) As an example of the reactor according to the embodiment, the sensor holder is provided with a holding portion covering the sensor. This holding portion may have a form with a length which is equal to or greater than the total length in an axial direction of the sensor.

The sensor holder is larger with respect to the total length in the axial direction of the sensor, making it possible to hold the sensor to the coil more securely at a suitable position, and thereby preventing the sensor from being detached. Moreover, even when the holding portion has such a length as to cover the total length of the sensor, the sensor can be assembled to the sensor holder independently from the insulator, the holding portion will not hinder this assembling. When outer circumference of the sensor is exposed without being covered with the encapsulating resin, the sensor may measure the physical quantity concerning another object other than the coil, which is the object to be measured. For example, in case the sensor is a temperature sensor for measurement of the temperature of the coil, the temperature sensor may measure an atmospheric temperature besides the temperature of the coil when exposed at the outer circumference thereof to atmosphere without being covered by anything. In the reactor according to the embodiment, the sensor is covered entirely with the holding portion, making it possible to securely measure the physical quantity of the coil, which is the object for the measurement.

(3) As an example of the reactor according to the embodiment in which the sensor holder is provided with the holding portion, it is conceivable that the holding portion is arranged to cover a portion of a wire connected to the sensor.

The holding portion is arranged to cover also the portion of the wire connected to the sensor, making it possible to restrict the position of the wire and reduce the possibility of breaking the wire as well as damage of the sensor resulting from the wire introduced to unexpected positions. In case the reactor according to the embodiment is provided with the encapsulating resin, the wire will not hinder the filling of encapsulating resin, thereby achieving superior filling workability.

(4) As an example of the reactor according to the embodiment, it is conceivable that the sensor holder is provided with a partitioning portion disposed between the coil elements.

With the partitioning portion inserted between the coil elements, the coil elements serve to guide the sensor holder, facilitating the fixture of the sensor holder. Moreover, when being formed of an insulating material and interposed between the coil elements, the partitioning portion can sufficiently serve as an insulator between the coil elements for achieving high insulation. Meanwhile, the partitioning portion is made of a material with a superior thermal conductivity, in case the sensor is a temperature sensor, the partitioning portion serves as a thermal conduction path from the coil, making it possible to measure the temperature with high precision.

(5) As an example of the reactor according to the embodiment, the sensor holder may be provided with an engaging portion which engages with the insulator.

The sensor holder is formed of a member independent from the insulator. The sensor holder and the insulator are provided with engaging portions which engages with each other to facilitate the positioning of the sensor holder. In addition, it is possible to securely fix the sensor holder to the configuration of the assembly and the insulator, and to prevent displacement and detachment of the sensor, achieving a superior assembling workability.

The reactor according to the above embodiment can be utilized preferably for components of the converter.

(6) The converter according to the embodiment is provided with a reactor according to any one of (1) to (5) mentioned above.

The converter according to the embodiment is provided with the compact reactor according to the embodiment, and thereby compact.

The converter according to the above embodiment can be provided preferably for components of the power conversion device.

(7) The power conversion device according to the embodiment is provided with the converter according to the embodiment.

The power conversion device according to the embodiment is provided with the compact converter according to the embodiment, and thereby compact.

The embodiments of the present disclosure will be explained with reference to drawings. In the drawings, same symbols refer to same members. In the following explanations, the installation side on which the reactor is installed is the bottom side, and the side opposite thereto is the top side.

<First Embodiment>

The reactor according to the first embodiment will be explained with reference to FIG. 1 to FIG. 5.

Overall Configuration of Reactor

Figure 2:
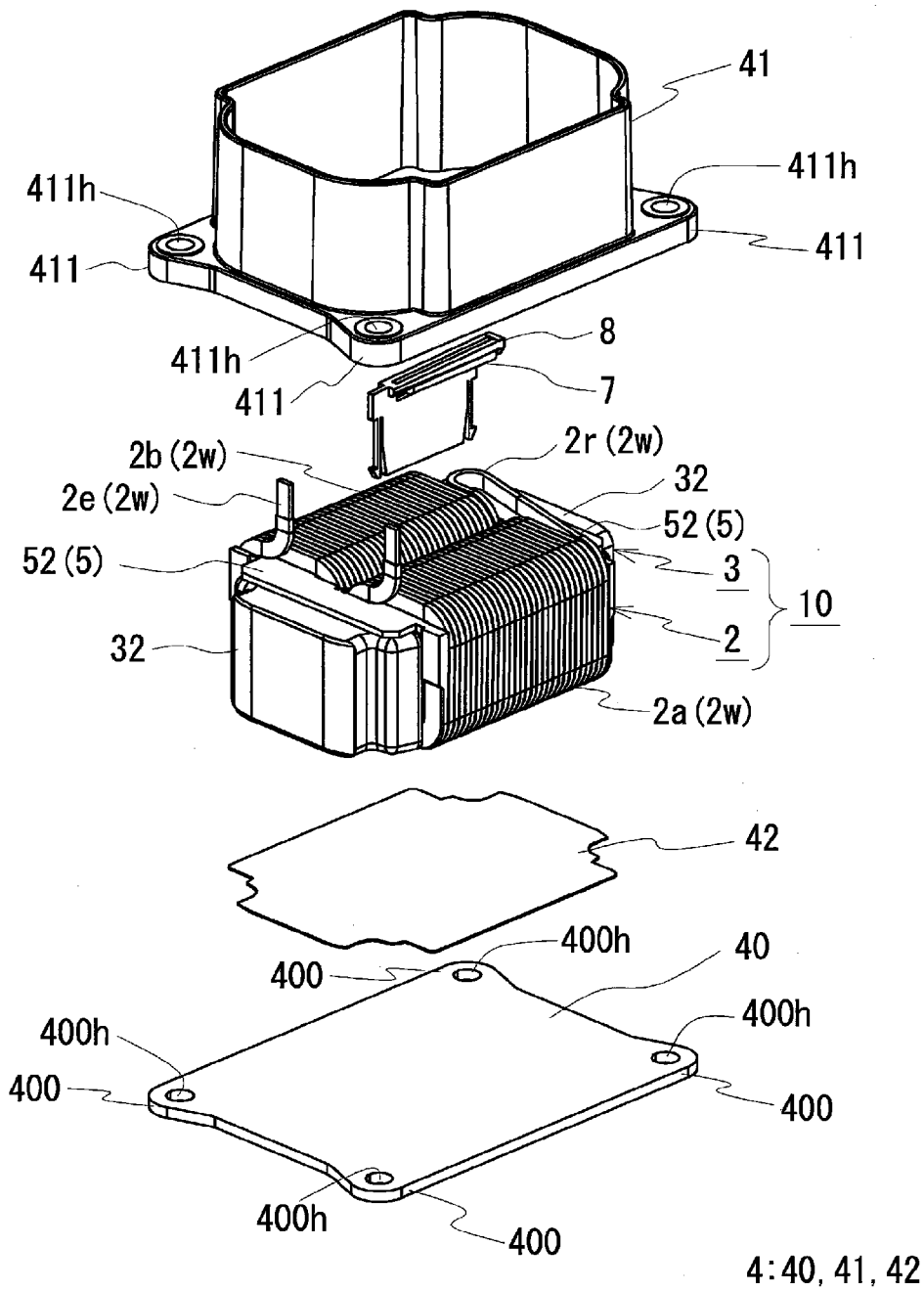
FIG. 2 is an exploded perspective view schematically showing the reactor according to the first embodiment.

The reactor 1 is provided with a coil 2 having a pair of coil elements 2a, 2b linked to each other, a magnetic core 3 having a pair of interior core portions 31 (FIG. 3) respectively disposed within the coil elements 2a, 2b and an exterior core portion 32 which connects the interior core portions 31 to form a closed magnetic path, and an insulator 5 interposed between the coil 2 and the magnetic core 3. The reactor 1 is further provided with a sensor 7 (FIG. 2) which measures a physical quantity concerning the reactor 1 during its operation, and a sensor holder 8 holding the sensor 7. The reactor 1 in this example is provided with a case 4 for accommodating an assembly 10 of the coil 2 and the magnetic core 3. The case 4 is a box whose one side is open (FIG. 2). The reactor 1 is characterized mainly with regar to the shapes of the coil elements 2a, 2b, and the position where the sensor 7 is disposed, as well as in that the sensor holder 8 holding the sensor 7 is formed of another member other than the insulator 5.

Hereinafter, the characterizing features will be explained first, and then other configurations will be explained in more detail.

Coil

Figure 5:
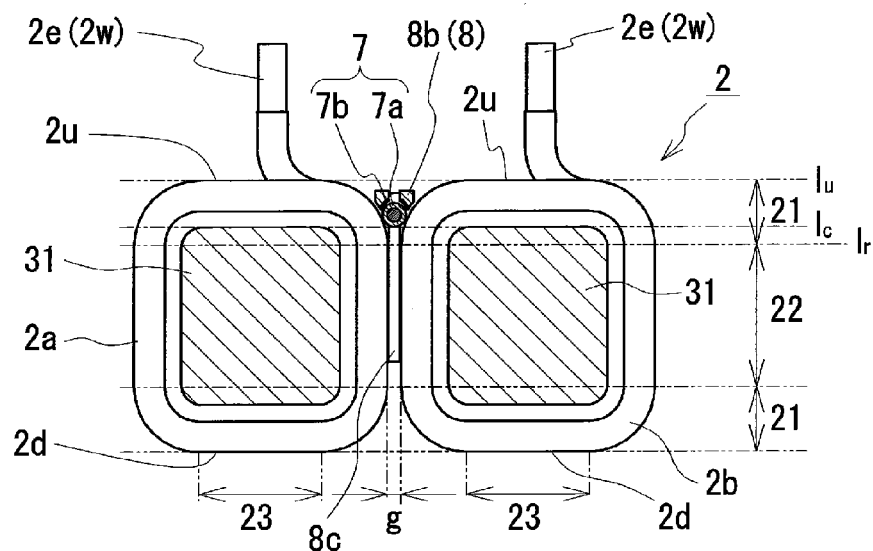
FIG. 5 is a cross-sectional view along V-V in FIG. 1.

The coil 2 will be explained mainly with reference to FIG. 3 and FIG. 5. For simplification, FIG. 5 mainly shows the coil 2, the sensor 7 and the sensor holder 8. FIG. 5 does not show the insulator 5 and so on.

The coil 2 is provided with a pair of coil elements 2a, 2b formed by spirally winding a single continuous wire 2w without connecting portions, and a coil connection portion 2r which connects both coil elements 2a, 2b. The coil elements 2a, 2b are formed of hollow tubular bodies with the same number of windings, and arranged in parallel (horizontal arrangement) such that their axial directions are arranged in parallel. The wire 2w is partially bent at the other end side (right side in FIG. 3) of the coil 2 into a U-shape, so forming a coil connection portion 2r. With this configuration, the winding direction is the same for both coil elements 2a, 2b.

It is also possible to use different wires for the preparation of coil elements, and to form a coil by connecting ends of the wires of the coil elements by means of welding, soldering, crimping and the like.

The wire 2w can be preferably formed of a coated wire which has a conductor made of an electrically conductive material such as copper, aluminum and an alloy thereof, and an insulating coat made of an insulating material provided around the conductor. The insulating coat preferably has a thickness of at least 20 micrometers and at most 100 micrometers. The thicker it is, the easier it is to reduce the generation of pin holes, and to improve its electrical insulation. The conductor is typically formed of a rectangular wire, and can be made of wires of any of a variety of cross-sectional shapes, such as circular, ellipitcal, polygonal and the like. A rectangular wire has the advantageous effect of easily forming a coil with a higher space factor, as shown in FIG. 3, and assuring a broader contact area with the adhesion layer 42 provided to the case 4 described below, compared to the case of using a round wire having a circular cross section. This configuration employs a coated rectangular wire which is formed of a copper rectangular wire conductor and an enamel insulating coat (typically made of polyamideimide). The coil elements 2a, 2b are edgewise coils formed by edgewise winding of coated rectangular wires.

Both ends 2e of the wire forming the coil 2 are appropriately extended from a turn forming portion at one end side of the coil 2 (left side in FIG. 3), and typically extended outward from the case 4 (FIG. 1). At both ends 2e of the wire, the conductor portion is exposed by removing the insulating coat. A terminal member (not shown) made of an electrically conductive material is connected to the conductor portion. By way of the terminal member, an external device (not shown) such as a power source for power supply is connected to the coil 2.

Each coil element 2a, 2b is formed to have a rounded rectangular end surface when viewed from an axial direction thereof (cross-sectional shape in a plane perpendicular to the axial direction), and includes four rounded corner portions 21, as well as long linear portions 22 and short linear portions 23 connecting the rounded corner portions 21. Therefore, the contour of each coil element 2a, 2b includes round lines that includes the rounded corner portions 21 and straight lines that includes the linear portions 22, 23, as shown in FIG. 5.

Each coil element 2a, 2b may have an end surface with a rounded polygonal shape other than rounded rectangular shape. However, the above rounded rectangular shape has the advantageous effects of: (1) easy winding of the wire 2w excellent coil productivity, (2) simplifying the inner circumferential shape and easy forming of the interior core portion having an outer circumferential shape similar to the inner circumferential shape of the coil element, and (3) reducing the dead space, making the coil compact.

The curvatures of the rounded corner portions are appropriately selected. The curvatures can be selected in view of the size of the coil 2 and the size of the employed wire 2w (width and thickness, in case of a rectangular wire). In particular, in case the coil 2 is an edgewise coil, it is easy to increase the curvature on the outer circumferential side of the wire 2w that includes the rounded corner portion 21 and to enlarge the trapezoid space serving to accommodate the sensor 7 between the adjacent both coil elements.

There is small clearance g between linear portions 22 of the coil elements 2a, 2b, as shown in FIG. 5, for improving the insulation between both coil elements 2a, 2b. It is noted that this clearance g is smaller (e.g. about 2 mm) than the thickness (e.g. about 3 mm) of the sensor 7. In this example, the clearance g is securely formed by partitioning portions 8c (FIGS. 4 and 5) of the sensor holder 8 described below.

The coil 2 having the rounded corner portions 21 has a trapezoid space interposed between the rounded corner portions 21 that face each other in the coil elements 2a, 2b, as shown in FIG. 5. The trapezoid space is formed at the top side and the bottom side of the reactor 1. Both of the trapezoid spaces have the same dimensions, and the trapezoid space formed on the top side will be explained as an example. More specifically, this trapezoid space refers to a space, which is surrounded by a straight line lr which connects an intersection between the top rounded corner portion 21 and the long linear portion 22 connected to this rounded corner portion 21, curved lines forming the rounded corner portions 21 of the two coil elements 2a, 2b, and a straight line (tangent) lu connecting surfaces (top surface 2u) formed by the short linear portions 23 on the top side of the both coil elements 2a, 2b. This embodiment is characterized in that the trapezoid space serves as a space in which the sensor 7 is disposed.

The dimensions of the trapezoid space can be adjusted with the curvatures of the rounded corner portions 21. If the curvature is set larger, the space for accommodating the sensor 7 can be easily enlarged. If the curvature is set smaller, the coil is easily made compact.

The sensor 7 is preferably disposed at a region which is not interposed between the interior core portions 31 in the trapezoid space. In this example, the interior core portions 31 having outer circumferential shapes similar to the inner circumferential shapes of the coil elements 2a, 2b are accommodated coaxially to the coil elements 2a, 2b. The region which is not interposed between the interior core portions 31 refers to a region above the tangent Ic, which is the straight line (tangent) connecting the top surfaces of both of the interior core portions 31.

In this example, as shown in FIG. 5, the sensor 7 is disposed at that region of the trapezoid space that is not interposed between the interior core portions 31 (the region surrounded by the tangent Ic, and the curved lines forming the rounded corner portions 21 on the top side of the coil elements 2a, 2b). In addition, in this example, the thickness of the sensor 7 is set sufficiently larger than the clearance g between the linear portions 22 of the coil 2. With this arrangement, the sensor 7 can be supported by the rounded corner portions 21 on the top side of the coil elements 2a, 2b, and prevented from falling into a region surrounded by the interior core portions 31, namely the region below the tangent Ic. This is to say, in this example, the sensor 7 is disposed automatically in the region of the trapezoid space that is surrounded by the tangent Ic and the rounded corner portions 21.

The trapezoid space is formed to extend from one end surface of the coil 2 to the other end surface thereof. The sensor 7 can be disposed at any portion in the trapezoid space. However, the sensor 7 is preferably disposed at an intermediate region of the trapezoid space that includes the center, in the axial direction, of the coil 2. For example, the intermediate region can be a region of up to 30% of the length in the axial direction of the coil 2 from the center to either side of the coil 2, that is, a region of up to 60% of the length in the axial direction of the coil 2 and including its center.

Sensor

Here, the sensor 7 is a temperature sensor, and may have a bar shaped form (see FIG. 4) which is provided with a heat sensitive element 7a (FIG. 5) such as thermistor, and a protection portion 7b (FIG. 5) protecting the heat sensitive element 7a. The protection portion 7b may be a tube made of resin or the like. A wire 71 (FIG. 4 (B)) for transmitting detected information to an external device such as a control device is connected to the sensor 7, Other than the temperature sensor, the sensor may also be a sensor for the measurement of a physical quantity during operation of the reactor, such as an electric current sensor, a voltage sensor, an acceleration sensor capable of measuring the vibration of the reactor.

When the reactor 1 was installed in a cooling base (not shown) and the temperature distribution between the coil elements 2a, 2b from the surface on the installation side of the coil 2 (bottom surface 2d (FIG. 5)) to the opposite surface (top surface 2u (FIG. 5)) was examined, it was found that a substantially intermediate portion between the coil elements 2a, 2b in height direction exhibits the highest temperature, and the temperature becomes lower at positions further away from the portion exhibiting the highest temperature. The bottom surface 2d and its proximity region is cooled with the cooling base, and exhibits the lowest temperature. The trapezoid space on the top side and the trapezoid space on the bottom side of the reactor 1 exhibit different temperatures, and may not be the portion exhibiting the highest temperature. In view of this, the temperature distribution is measured in advance for the temperatures at the top and bottom trapezoid spaces and the highest temperature. With this measurement, it is possible to obtain the highest temperature of the reactor on the basis of relationship in the temperature distribution when the temperature is measured in the trapezoid spaces. As a result, it is possible to regulate the electric current to the coil 2 according to the measured temperatures.

Sensor Holder

Figure 4A:
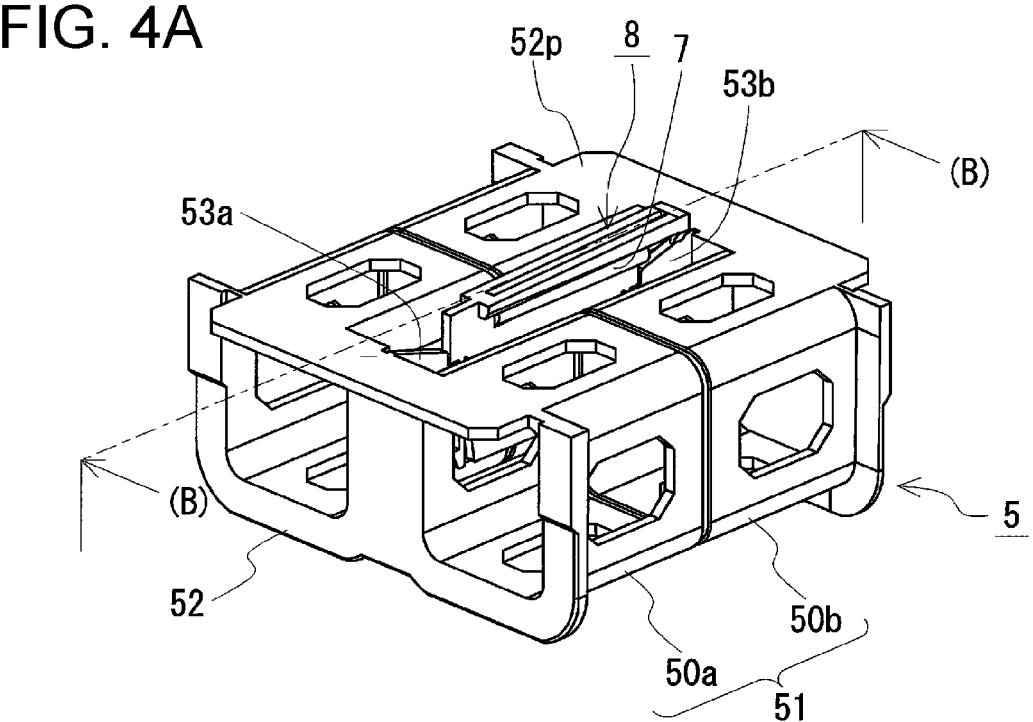
FIGS. 4(A) and 4(B) show an insulator and a sensor holder provided in the reactor according to the first embodiment.
Figure 4B:
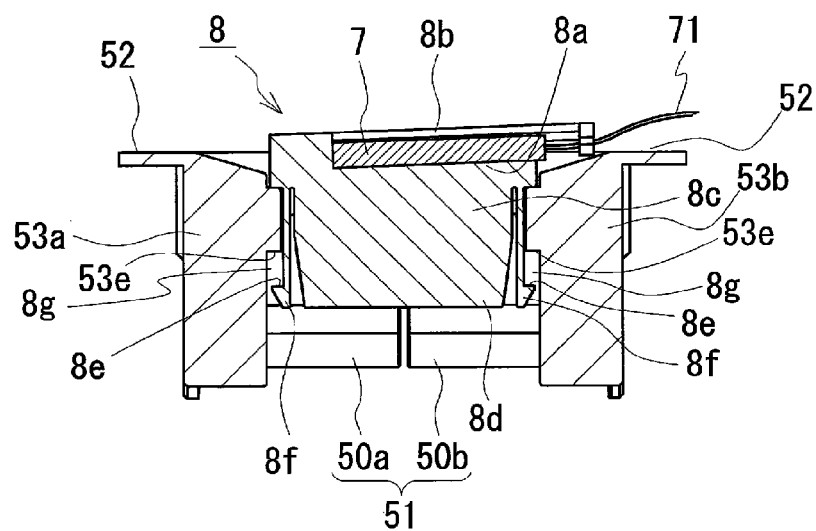

As shown in FIG. 4, the sensor holder 8 is provided with a strip-shaped mounting portion 8a on which the sensor 7 is mounted, a holding portion 8b which is disposed to form a slit between the mounting portion 8a and the holding portion 8b, and a plate-shaped partitioning portion 8c extending to a side opposite to the holding portion 8b of the mounting portion 8a. Here, the mounting portion 8a, holding portion 8b and the partitioning portion 8c are molded integrally. The slit serves as a space for accommodating the sensor 7. When the sensor 7 is accommodated in this slit, the sensor 7 is interposed vertically between the holding portion 8b and the mounting portion 8a, and exposed horizontally. This embodiment is characterized partially in that the sensor holder 8 holds the sensor 7 disposed in the trapezoid space mentioned above. The sensor 7 may not come into contact with the coil 2, but is preferably arranged to come into contact with the coil 2 for further improving the reliability of the measurement values. Here, the sensor 7 is held while coming into contact with the coil 2.

The holding portion 8b has a stick-like form having a supported end formed in one piece with the mounting portion 8a at one end thereof (left side in FIG. 4 (B)) and a free end at the other end (right side in FIG. 4 (B)). The holding portion 8b preferably has a length larger than the total length in the axial direction of the sensor 7. In this case, the sensor 7 can be covered by the holding portion 8b over an entire length along the axial direction of the sensor 7, making it possible to reduce adverse effect on the measurement precision resulting from the cooling of the sensor 7 by the atmosphere. In addition, the sensor 7 can be securely held to the coil 2 side at an appropriate position, making it possible to directly measure a physical quantity of the coil 2, which is the object to be measured, and to measure the temperature of the coil 2 with higher precision by preventing measurement of a physical quantity concerning something other than the coil 2, such as of the atmosphere or the like. Moreover, it is preferred that also the wire 71 connected to the sensor 7 is partially covered, so that the position of the wire 71 can be fixed. In this embodiment, the length of the mounting portion 8a is substantially equal to the length in the axial direction of the sensor 7, and the holding portion 8b has a length that is slightly larger than that of the mounting portion 8a, protruding along the wire 71 in the axial direction of the sensor 7. The surface of the holding portion 8b coming into contact with the sensor 7 is an arc-shaped curved surface similar to the exterior shape of the sensor 7. In addition, the end portion of the holding portion 8b on the wire 71 side has an arc-shaped curved surface similar to the exterior shape of the wire 71 such that the wire is easily guided outward from the reactor 1.

The partitioning portion 8c is a plate that is disposed in the clearance g, which is provided between the linear portions 22 of the coil elements 2a, 2b. Here, the partitioning portion 8c is a rectangular plate. The thickness of the partitioning portion 8c is equal to or less than the dimension of the clearance g, and is smaller than the thickness of the sensor 7. The partitioning portion 8c is provided with a main portion 8d extending in the axial direction of the coil 2, and engaging portions 8e which come into contact with frame plate portions 52 of the insulator 5 described below at both ends of the main portion 8d and engage with engaging portions 53 formed at the frame plate portions 52. The main portion 8d is tapered such that the width of both lateral surfaces at a front edge side in the direction in which the sensor holder 8 is inserted into the clearance g is decreased at the front edge. The engaging portions 8e are provided at ends thereof on the front side with hooks 8f protruding towards the frame plate portion 52 side. Each hook 8f is tapered to be thinner towards the front edge.

When the sensor holder 8 is inserted into the clearance g, the sensor holder 8 is positioned by engaging the hooks 8f of the engaging portions 8e with the engaging portions 53e of the frame plate portions 52, preventing the sensor holder 8 from being detached. In this embodiment, there is a clearance 8g provided between the hooks 8f and the engaging portions 53e. With this clearance 8g, it is possible to remove the sensor holder 8 before the hooks 8f are abutted against the engaging portions 53e even after the sensor holder 8 is inserted, and to easily insert and remove the sensor 7 into and from the mounting portion 8a.

The partitioning portion 8c can be integrally formed with the holding portion 8b, or they may be separate members that are joined together by a fixing member.

When the sensor holder 8 is inserted into the clearance g, as shown in FIG. 5, the sensor 7 comes into contact with the rounded corner portions 21 of the coil elements 2a, 2b while being exposed from the sensor holder 8. In particular, the sensor 7 is pressed by the holding portion 8b, so as to be securely kept in contact with the coil 2.

The sensor holder 8 may utilize an insulating material such as polyphenylene sulfide (PPS) resin, polytetrafluoroethylene (PTFE) resin, polybutylene terephthalate (PBT) resin or liquid crystal polymer (LCP). In this case, even when the sensor holder 8 is disposed to be in contact with the coil 2, both exhibit superior insulation. In addition, when the sensor holder 8 is at least partially formed of a metal, it is possible to improve its heat dissipation.

Magnetic Core

The magnetic core 3 will be explained with reference to FIG. 3. The magnetic core 3 is provided with the pair of interior core portions 31 covered with the coil elements 2a, 2b, and the pair of exterior core portions 32 in which the coil 2 is not disposed. The pair of exterior core portions 32 is exposed from the coil 2. Here, each interior core portion 31 is columnar, having a rounded rectangular external shape along the inner circumferential shape of the coil elements 2a, 2b. Each exterior core portion 32 is columnar with a pair of trapezoid surfaces. The magnetic core 3 forms a ring by disposing the exterior core portions 32 on both sides of the interior core portions 31, which are spaced from each other, and by arranging end surfaces 31e of the interior core portions 31 to be in contact with inner end surfaces 32e of the exterior portions 32. The interior core portions 31 and the exterior portions 32 form a closed magnetic path when the core 2 is magnetically excited.

Figure 3:
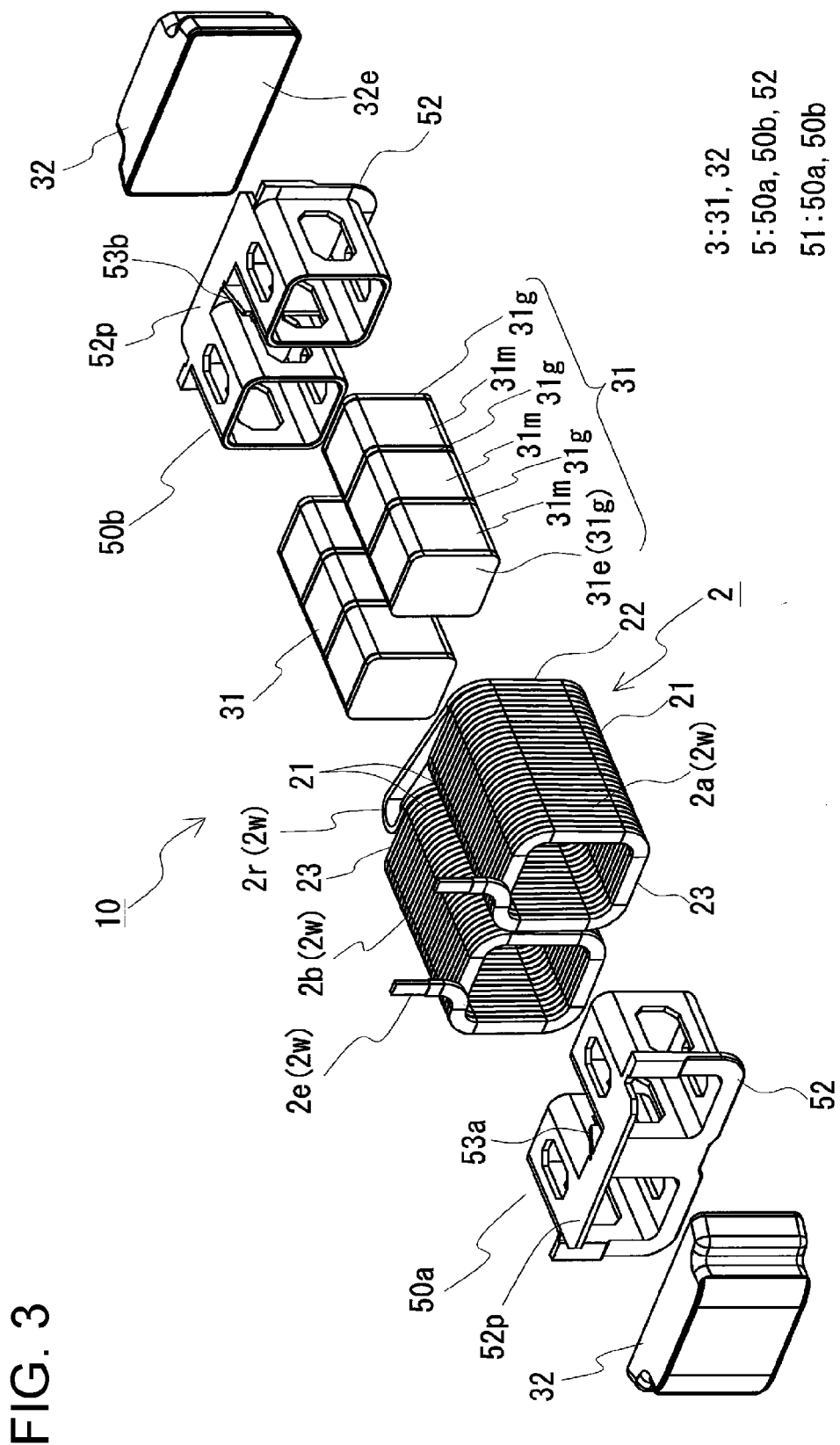
FIG. 3 is an exploded perspective view schematically showing an assembly of a coil and a magnetic core provided in the reactor according to the first embodiment.

As shown in FIG. 3, each interior core portions 31 has a layered structure formed by alternately superimposing a plurality of core pieces 31m made of a soft magnetic material and gap materials 31g made of a material having a smaller relative permeability than the core pieces 31m. The core pieces 31m and the gap pieces 31g can be unified to each other with an adhesive, enabling them to be easily handled. The core pieces 31m and the gap pieces 31g can be securely fixed to each other, making it possible to reduce noise. Moreover, the core pieces 31m and the gap pieces 31g can be unified to each other with an adhesive tape, enabling them to be easily handled. The exterior core portion 32 is formed of a core piece made of a soft magnetic material.

The core pieces forming the interior core portions 31 and exterior core portions 32 can be formed of a molded body of a soft magnetic powder typically made of an iron group metal such as iron, an alloy thereof, and an oxide containing iron, or a laminate plate formed by laminating a plurality of magnetic thin plates (electromagnetic steel plate, typically silicon steel, for example) with an insulating coat. The molded body can be a pressed powder molded body, a sintered body, or a composite material formed by injection molding or cast molding of a mixture of a soft magnetic material and a resin. The core pieces are formed of pressed powder molded body of a soft magnetic metal powder containing iron, such as iron and steel.

Specifically, the gap material 31g may be formed of a non-magnetic material such as aluminum and unsaturated polyester, or a mixture containing a non-magnetic material, such as polyphenylene sulfide (PPS), and a magnetic powder (for example, soft magnetic powder such as iron powder). The gap material 31g can be formed of a well-known material.

The core pieces that includes the magnetic core 3 are formed of one and the same material (pressurized powder molded article), and can be arranged to have different magnetic characteristics or properties in the interior core portions 31 and the exterior core portions 32. For example, they may be a combination of a pressurized powder and a composite material, a combination of composite materials with different material properties or mixing amounts of soft magnetic powder, or the like.

In the magnetic core 3 in this example, the surface of the interior core portion 31 on the installation side is not flush with the surface of the exterior core portion 32 on the installation side. The surface of the exterior core portion 32 on the installation side protrudes from the interior core portion 31 and is flush with the surface of the coil 2 on the installation side (bottom surface 2d in FIG. 5). The surface of the assembly 10 of the coil 2 and the magnetic core 3 on the installation side is formed of the bottom surfaces 2d of the two coil elements 2a, 2b and the surface of the exterior core portion 32 on the installation side. Both of the coil 2 and the magnetic core 3 come into contact with an adhesion layer 42 (FIG. 2) described below, making it possible to achieve a superior heat dissipation of the reactor 1. In addition, the surface of the assembly 10 on the installation side can be formed of both of the coil 2 and the magnetic core 3, making it possible to achieve a sufficiently large contact area for contact with an object to be fixed, achieving superior stability in installation of the reactor 1. Moreover, the core pieces are formed of pressurized powder molded bodies, making it possible to utilize a portion of the exterior core portion 32 protruding from the interior core portion 31 as a path of magnetic flux.

Insulator

The insulator 5 will be explained with reference to FIGS. 3 and 4. The insulator 5 is provided with a tubular portion 51 accommodating the interior core portions 31, and a frame plate portion 52 interposed between the end surfaces of the coil elements 2a, 2b and the inner end surfaces 32e of the exterior core portions 32. The tubular portion 51 serves as an insulator between the coil elements 2a, 2b and the interior core portions 31. The frame plate portion 52 serves as an insulator between the end surfaces of the coil elements 2a, 2b and the inner end surfaces 32e of the exterior core portions 32. This insulator 5 is characterized in that it includes a member independent from the sensor holder 8 mentioned above, and provided with engaging portions for engaging with each other.

The tubular portion 51 includes tubular segments 50a, 50b fitted to the outer circumferential shape of the interior core portion 31, and formed by unifying the pair of the segments 50a, 50b. The shapes of the segments 50a, 50b can be selected as appropriate. Here, when the segments 50a, 50b are disposed on the outer circumferential surface of the interior core portion 31, the interior core portion 31 is partially exposed. In this configuration, if an encapsulating resin is provided as described below, it is possible to easily degas during the filling of the encapsulating resin, thus achieving superior productivity, and to increase the contact area between the interior core portion 31 and the encapsulating resin, reducing noise.

The frame plate portion 52 is a B-shaped planar plate portion having a pair of openings (through-holes) in which two interior core portions 31 can be inserted. The frame plate portion 52 is provided with partitioning pieces 53a, 53b which are interposed between the both coil elements 2a, 2b when assembled to the coil 2, and a plate base 52p disposed between the coil connecting portion 2r and the exterior core portion 32. The partitioning pieces 53a, 53b protrude from one surface of the frame plate portion 52 towards the coil side, and are tapered inwards at both lateral surfaces in the direction towards the coil side. With this tapered structure, the sensor holder 8 can be easily inserted into the clearance g. The partitioning pieces 53a, 53b are provided at end surfaces thereof on the coil side with engaging portions 53e for engaging with the hooks 8f of the sensor holder 8. The base 52p protrudes from the other surface of the frame plate portion 52 towards the exterior core portion 32.

The insulator 5 can be made of an insulating material such as polyphenylene sulfide (PPS) resin, polytetrafluoroethylene (PTFE) resin, polybutylene terephthalate (PBT) resin, and a liquid polymer (LCP).

Case

The case 4 will be explained with reference to FIG. 2. The case 4, in which the assembly 10 of the coil 2 and the magnetic core 3 is accommodated, is provided with a planar bottom plate portion 40 and a frame-shaped lateral wall portion 41 formed to erect from the bottom plate portion 40. In the case 4 of the reactor 1, the bottom plate portion 40 and the frame lateral wall portion 41 are not integrally formed, but are formed of individual members that are unified with a fixing material. The bottom plate portion 40 is provided with an adhesion layer 42.

Bottom Plate Portion

The bottom plate portion 40 is typically a plate material, which is fixed to come into contact with an object to which the reactor is to be installed when the reactor is installed. The bottom plate portion 40 is utilized as a heat dissipation path of the coil 2, and generally made of a metal, which is a high thermally conductive material. Specifically, the metal may be aluminum or an alloy thereof, magnesium or an alloy thereof, copper or an alloy thereof, silver or an alloy thereof, iron, an austenite stainless steel, or the like. With use of aluminum, magnesium or an alloy thereof, it is possible to prepare a light case. The thickness of the bottom plate portion 40 can be 2 mm to 5 mm, for example, in consideration of strength, shield performance, heat dissipation, and noise characteristics. Here, the bottom plate portion 40 is made of an aluminum alloy, and exhibits a thermal conductivity sufficiently higher than the lateral wall portion 41 described below. This bottom plate portion 40 is provided with the adhesion layer 42 on the one surface that is disposed inside when the case 4 is assembled.

The external shape of the bottom plate portion 40 can be selected as appropriate. Here, the bottom plate portion 40 has a rectangular shape, as shown in FIG. 2, and has attachment portions 400 protruding from its four corners. The lateral wall portion 41 also has attachment portions 411. When the bottom plate portion 40 and the lateral wall portion 41 are assembled to each other so as to form the case 4, the attachment portions 400 of the bottom plate portion 40 are superimposed on the attachment portions 411 of the lateral wall portion 41. The attachment portions 400, 411 are provided with bolt holes 400h, 411h which communicate each other. Bolts (not shown) are inserted into the bolt holes 400h, 411h for fixing the case 4 to the object to which the reactor is to be installed. The shapes and number of the attachment portions 400, 411 are selected, as appropriate. When including a metal tube, the bolt holes 411h of the lateral wall portion 41 exhibits a superior strength, even in case that the lateral wall portion 41 is made of a resin as described below.

Here, the bottom plate portion 40 is installed on the lower side, but may be installed on the upper side, or lateral sides.

Adhesion Layer

The bottom plate portion 40 is provided with the adhesion layer 42 at least at a portion that comes in contact with the surface (bottom surface 2d (FIG. 5)) of the coil 2 on the installation side.

When having a single layer structure made of an insulating material, the adhesion layer 42 can be easily formed, and serve as an insulator between the coil 2 and the bottom plate portion 40 even when the bottom plate portion 40 is metallic. When the adhesion layer 42 has a multi-layer structure made of an insulating material, it is possible to further improve its insulation. When it has a multi-layered structure made of the same material, it is possible to reduce the thickness of each layer. With the use of thinner layers, even in the presence of pin holes, it is possible to assure the insulation by closing the pin holes with adjacent another layer. Meanwhile, when the structure is a multi-layered structure with different materials, it is possible to combine a plurality of characteristics, such as the insulating and adhesion performances between the coil 2 and the bottom plate portion 40, and heat dissipation from the coil 2 to the bottom plate portion 40 and the like. In this case, at least one layer is made of an insulating material.

The adhesion layer 42 can have any shape, as long as it has an area large enough to sufficiently come into contact with at least the surface (bottom surface 2d) of the coil 2 on the installation side. Here, as shown in FIG. 2, the adhesion layer 42 is shaped to be fitted to the shape of the surface of the assembly 10 on the installation side, that is, the surfaces of both coil 2 and the exterior core portion 32 on the installation side. Accordingly, it is possible to arrange both of the coil 2 and the exterior core portion 32 to sufficiently come into contact with the adhesion layer 42.

In particular, it is preferred that the adhesion layer 42 has a multi-layered structure, which is provided with an adhesive layer made of an insulating material on the side of the surface coming into contact with the surface of the coil 2 on the installation side, and a heat dissipation layer made of a highly thermally conductive material in the side coming into contact with the bottom plate portion 40. Here, the adhesion layer 42 is provided with the adhesive layer and the heat dissipation layer.

The adhesive layer can be preferably made of a material exhibiting a strong adhesion. For example, the adhesive layer can be formed by an insulating adhesive, specifically, an epoxy adhesive, acryl adhesive or the like. The adhesive layer can be formed by applying on the heat dissipation layer, or by screen printing and the like, for example. A sheet adhesive agent can be utilized for the adhesive layer. Here, the adhesive layer has a single layer structure made of an insulating adhesive.

The heat dissipation layer can be preferably made of a material with superior heat dissipation, preferably a material having a heat conductivity over 2 W/m·K. The heat dissipation layer is preferably formed of a material with a higher thermal conductivity, 3 W/m·K or more, more preferably 10 W/m·K or more, further preferably 20 W/m·K or more, particularly preferably 30 W/m·K or more.

The heat dissipation layer can be formed of a metal material, for example, as a specific component material. Metal materials generally exhibit a high thermal conductivity, but are electrically conductive materials. Therefore, the increased insulation of the adhesion layer is desired. The heat dissipation layer made of the metal material tends to become heavier. Meanwhile, the heat dissipation layer is preferably made of a material which is selected from a metal element, or a non-metal inorganic material such as oxides, carbides, nitrides of B and Si, such as ceramics as a component material, which have superior heat dissipation and electric insulation. Specifically, the ceramic may be silicon nitride ($Si_3Nd_4$): 20 W/m·K to 150 W/m·K, alumina ($Al_2O_3$): 20 W/m·K to 30 W/m·K, aluminum nitride (AlN): 200 W/m·K to 250 W/m·K, boron nitride (BN): 50 W/m·K to 65 W/m·K, silicon carbide (SiC): 50 W/m·K to 130 W/m·K, for example. The heat dissipation layer can be formed of the ceramic by utilizing a vapor deposition such as PVD and CVD, or adhering the sintered plate of the above ceramic to the bottom plate portion 40 with an appropriate adhesive agent, for example.

The heat dissipation layer can be formed of an insulating resin (for example, epoxy resin and acryl resin) containing a filler made of the ceramic as a component material. This material makes it possible to obtain a heat dissipation layer with both superior heat dissipation and superior electric insulation. In addition, in this case, both of the heat dissipation layer and the adhesive layer are made of insulating materials. Namely, the adhesion layer is entirely formed of an insulating material, and exhibits a further superior insulation. When the adhesive is made of the insulating resin, it is possible to achieve a superior adhesion performance between the heat dissipation layer and the adhesive layer. The adhesive layer provided with the heat dissipation layer can securely adhere the coil 2 to the bottom plate portion 40. The adhesive layer and the heat dissipation layer may be made of different adhesives. But, when the adhesion layer and the heat dissipation layer are made of the same adhesive, it is possible to achieve superior adhesion performance and to easily form the adhesion layer. The adhesion layer may be entirely formed of an insulating adhesive agent containing the filler. In this case, the adhesion layer has a single layer structure formed of a single material.

The heat dissipation layer can be easily formed of the resin containing fillers by applying on the bottom plate portion 40 or by means of screen printing, for example.

The heat dissipation layer may have a single layer structure or a multi-layered structure. In case of the multi-layered structure, it is possible to use a different material for at least one layer. For example, the heat dissipation layer can be arranged to have a multi-layered structure made of materials with different heat conductivities, for example.

If a heat dissipation layer provided is, it is possible to assure the heat dissipation. Therefore, it is possible to increase the degree of freedom in selection of available encapsulating resins in the configuration provided with the encapsulating resin. For example, a resin with weak heat conductivity, such as a resin containing no filler, may be used as the encapsulating resin.

Lateral Wall

The lateral wall portion 41 is frame-shaped (here, it is rectangular). When the case 4 is assembled by closing one opening with the bottom plate portion 40, the lateral wall portion 41 is disposed to surround the periphery of the assembly 10 while the other opening is opened. Here, the lateral wall portion 41 has a rectangular form which is fitted to the external shape of the bottom plate portion 40 in a region on the installation side when the reactor 1 is installed to the object to which it is fixed. The opened region in the opening side has a curved surface form fitted to the outer circumferential surface of the assembly 10 of the coil 2 and the magnetic core 3.

The lateral wall portion 41 is made of an insulating resin. Even in case the coil 2 and the lateral wall portion 41 are disposed in proximity to each other (for example, in case the clearance between the outer circumferential surface of the coil 2 and the interior surface of the lateral wall portion 41 has a dimension of 0 mm to about 1.0 mm), as shown in FIG. 1, it is possible to achieve a superior insulation between the coil 2 and the lateral wall portion 41. With the smaller clearance, it is possible to provide a compact reactor 1. The insulating resin may be PBT resin, urethane resin, PPS resin, acrylonitrile-butadiene-styrene (ABS) resin.

When the lateral wall portion 41 is at least partially made of a metal (in particular, non-magnetic metal such as aluminum or magnesium), it is possible to improve the heat dissipation and shield function. When being entirely made of an insulating resin as in this example, the lateral wall portion 41 brings the advantageous effects of (1) exhibiting a superior insulation between the coil 2 and the case 4, (2) facilitating fabrication by means of injection molding even in case of a complicated form, and (3) achieving a reduced weight.

Connection Method

The bottom plate portion 40 and the lateral wall portion 41 are unified to each other by connection bolts as described above. It is possible to use an adhesive in combination with the connection bolts. Alternatively, the bottom plate portion 40 and the lateral wall portion 41 may also be connected to each other only by the adhesive. In this case, for example, it is possible to form both the adhesive layer used for the adhesion layer 42 and an adhesive layer which adheres the bottom plate portion 40 to the lateral wall portion 41. In this embodiment, it is possible to reduce the steps of the curing process by simultaneously performing the process of curing the adhesion layer 42 and the process of curing the adhesive layer which adheres the bottom plate portion 40 to the lateral wall portion 41. Accordingly, it is possible to improve the productivity.

Encapsulating Resin

The encapsulating resin 6 (FIG. 1) can be filled into the case 4. The encapsulating resin 6 can securely position the assembly 10 and so on accommodated in the case 4, protect the assembly 10 and so on mechanically or protect the same from external environment (improvement in corrosion resistance), as well as improving the heat dissipation depending on the material and the insulation. In this embodiment, for example, when the end of the wire 2w is exposed from the encapsulating resin, it is possible to connect the end of the wire 2w with a terminal clasp (not shown). After the connection of the end of the wire 2w with the terminal clasp, it is also possible to embed the connection portion within the encapsulating resin.

The encapsulating resin 6 may be epoxy resin, urethane resin, silicone resin or the like. In addition, the encapsulating resin may contain superior insulating and thermal conductive fillers, for example at least one ceramics selected from silicon nitride, alumina, aluminum nitride, boron nitride, mullite and silicon carbide, for improving heat dissipation.

In the embodiment provided with the encapsulating resin 6, when a packing (not shown) is provided between the bottom plate portion 40 and the lateral wall portion 41, it is possible to prevent uncured resin from leaking out from the clearance between the bottom plate portion 40 and the lateral wall portion 41. When the bottom plate portion 40 and the lateral wall portion 41 are unified to each other with an adhesive, the adhesive serves to tightly close any gaps between the bottom plate portion 40 and the lateral wall portion 41 for preventing the uncured resin from leaking out, making it possible to omit the use of packing.

<<Fabrication of Reactor>>

The reactor 1 with the above embodiment can be typically fabricated by steps of preparing the assembly, preparing the bottom plate portion, fixing the assembly, assembling the case, disposing the sensor, and filling the encapsulating rein.

Preparation of Assembly

The preparation process of the assembly 10 of the coil 2 and the magnetic core 3 will be explained. Specifically, as shown in FIG. 3, the interior core portions 31, which are formed by superimposing the core pieces 31m and the gap materials 31g, and one segment piece 50a of the insulator 5 are inserted into the coil elements 2a, 2b. Here, the interior core portion 31 is formed into cylindrical shape, and prepared by connecting the outer peripheral surface of the stack of the core pieces 31m and the gap materials 31g with an adhesive tape. Next, the other segment 50b of the insulator 5 is inserted into the other end surfaces of the coil elements 2a, 2b. The core pieces 31m and the gap members 31g may be separately provided, without being unified with each other with use of an adhesive tape or an adhesive agent. In this case, one of the core pieces 31m and the gap materials 31g are supported by the one segment 50a, while the other of the core pieces 31m and the gap materials 31g are supported by the other segment 50b and inserted into the coil elements 2a, 2b.

Next, the frame plate portions 52 and the exterior core portions 32 are disposed inside the coil 2 such that the end surfaces of the two coil elements 2a, 2b and the end surface 31e of the interior core portion 31 are interposed between the frame plate portions 52 of the insulator 5 and between the interior end surfaces 32e of the exterior core portions 32, so as to form the assembly 10. In this embodiment, the end surfaces 31e of the interior core portions 31 are exposed from the opening portions of the frame plate portions 52 so as to come into contact with the interior end surfaces 32e of the exterior core portions 32. The partitioning pieces 53a, 53b of the insulator 5 are interposed between the both coil elements 2a, 2b. The clearance g can be provided between the both coil elements 2a, 2b, according to the thicknesses of the partitioning pieces 53a, 53b.

Preparation of Bottom Plate Portion, Fixture of Assembly

As shown in FIG. 2, the bottom plate portion 40 with the adhesion layer 42 can be prepared by stamping an aluminum plate into a predetermined shape in order to form the bottom plate portion 40, and performing screen printing on one surface in order to form the adhesion layer 42 with a predetermined shape. Next, the assembled assembly 10 is mounted on the adhesion layer 42, and then fixed to the bottom plate portion 40 by appropriately curing the adhesion layer 42.

With the adhesion layer 42, it is possible to tightly adhere the coil 2 to the bottom plate portion 40, and to securely position the coil 2 and the exterior core portions 32 as well as the interior core portions 31 interposed between the pair of exterior core portions 32. Accordingly, it is possible to form the magnetic core 3 provided with the interior core portions 31 and the exterior core portions 32 into a ring, without adhering the interior core portions 31 to the exterior core portions 32 with an adhesive or unifying the core pieces 31m to the gap materials 31g with an adhesive or the like. In addition, the adhesion layer 42 includes the adhesive agent, making it possible to securely fix the assembly 10 to the adhesion layer 42.

Assembling of Case

The lateral wall portion 41 is disposed to cover on the bottom plate portion so as to surround the outer circumferential surface of the assembly 10. The bottom plate portion 40 and the lateral wall portion 41 are unified to each other by means of bolts (not shown) separately provided. In this process, as shown in FIG. 1, it is possible to assemble the box-shaped case 4 and accommodate the assembly 10 in the case 4.

Disposition of Sensor

First, the sensor 7 is assembled to the sensor holder 8. The sensor 7 is mounted on the mounting portion 8a of the sensor holder 8, and then arranged to be interposed between the mounting portion 8a and the holding portion 8b, so as to be held with the sensor holder 8. In this embodiment, the sensor 7 is held at an intermediate position in the width direction of the sensor holder 8. Next, the sensor holder 8 holding the sensor 7 is disposed in the trapezoidal space formed above both of the coil elements 2a, 2b. Here, the partitioning portion 8c of the sensor holder 8 is inserted into the clearance g provided between the coil elements 2a, 2b, and then the hooks 8f of the sensor holder 8 and the engaging portions 53e of the frame plate portions 52 are engaged with each other, so as to be unified to each other. In this embodiment, as shown in FIG. 5, the sensor 7 exposed from the mounting portion 8a and the holding portion 8b of the sensor holder 8 is held in contact with the coil 2 at appropriate positions in the rounded corner portions on the top side of both of the coil elements 2a, 2b. The part of the wire 71 connected to the sensor 7 is also covered with the holding portion 8b, and guided outward from the reactor 1 via the end portion of the holding portion 8b.

Here, the sensor 7 is assembled to the sensor holder 8, and then the mounting portion 8a and the holding portion 8b of the sensor holder 8 are disposed in the trapezoidal space. It is also possible to dispose the mounting portion 8a and the holding portion 8b of the sensor holder 8 in the trapezoidal space, and then assemble the sensor 7 to the sensor holder 8. In this case, the partitioning portion 8c of the sensor holder 8 is inserted into the clearance g, so as to be unified to the frame plate portion 52. With the clearance 8g between the hooks 8f and the engaging portions 53e, it is possible to remove the sensor holder 8 before the hooks 8f are abutted against the engaging portions 53e, and to assemble the sensor 7 in this embodiment.

Filling of Encapsulating Resin

It is possible to form the reactor 1 provided with the encapsulating resin 6 by filling the encapsulating resin 6 into the case 4 and then curing the same. In this embodiment, it is possible to fix also the sensor 7 and the wire 71 with the encapsulating resin 6.

<<Utilization>>

The reactor 1 mentioned above can be preferably utilized as a component of a power conversion device to be mounted on vehicles, typically electric-powered automobiles and hybrid automobiles, under the energization condition that, for example, the maximum current (direct current) ranges from 100A to 1000A, an average voltage ranges from 100V to 1000V, and a used frequency ranges from 5 kHz to 100 kHz.

<<Effect>>

As shown in FIG. 5, in the reactor 1 according to this embodiment, the coil 2 is arranged to have a predetermined shape, and the sensor 7 is disposed in the trapezoidal space formed by the rounded corner portions 21, which is a specific region formed by the predetermined shape of the coil 2. With this configuration, it is possible to reduce a stress applied on the sensor 7 (stress applied by a thermally expanded coil 2) or substantially eliminate the applied stress. Accordingly, the sensor 7 can be prevented from being damaged by the stress, enabling the reactor 1 to adequately measure the temperature of the coil 2. Moreover, in the reactor 1, the sensor 7 is disposed in the dead space, namely the region (region above the tangent Ic in the trapezoidal space) on which the stress is hardly applied or substantially not applied. Accordingly, the reactor 1 can be made compact without being enlarged by the disposition of the sensor 7 or the protection of the sensor 7.

In the reactor 1 according to this embodiment, with the use of sensor holder 8 made of a member independent from the insulator 5, it is possible to securely hold the sensor 7 in relation to the coil at an adequate position. Therefore, even when the encapsulating resin 6 is provided, a physical quantity such as the temperature of the coil can be appropriately measured, making it possible to improve the reliability of the measurement value. In particular, the sensor 7 is held in contact with the coil 2, making it possible to measure the physical quantity in the closest position to the coil 2, further improving in the reliability of the measurement value. Moreover, the sensor 7 can be assembled to the sensor holder 8 and then disposed in the trapezoidal space, and thereby it is possible to easily dispose the sensor 7 and to achieve superior productivity. In particular, the sensor holder 8 has a length larger than the total length in the axial direction of the sensor 7, allowing the sensor to come into contact substantially only with the object to be measured, and making it possible to prevent the measurement of a physical quantity for others except the object to be measured. The sensor holder 8 is positioned by engaging with the insulator 5 (frame plate portion 52), and prevented from being detached. Moreover, when the sensor holder 8 and the insulator 5 are engaged with each other, with the clearance 8g between the hooks 8f and the engaging portions 53e, it is possible to remove the sensor holder 8 before the hooks 8f are abutted against the engaging portions 53e and to easily insert and remove the sensor 7 into and from the sensor holder 8 anytime.

<Second Embodiment>

In the first embodiment mentioned above, an embodiment was explained in which the bottom plate portion 40 and the lateral wall portion 41 are formed of independent members. Alternatively, it is also possible to provide a case formed of a box in which the bottom plate portion and the lateral wall portion are integrally formed with each other. With this configuration, when the case is entirely made of a metal such as aluminum mentioned above, it is possible to utilize the entire case as a heat dissipation path and to improve heat dissipation.

<Third Embodiment>

In the embodiments mentioned above, an embodiment was explained that is provided with a case. Alternatively, a configuration is also possible in which no case is provided. This configuration is not provided with a case, and is therefore made compact. Moreover, when the outer periphery of the assembly 10 is coated with a resin by means of injection molding, it is possible to (1) securely fix the sensor 7 with the resin in the trapezoidal space of the coil 2 for the prevention of detachment or displacement of the sensor 7, (2) protect the assembly 10 from external environment or protect the same mechanically, and (3) improve heat dissipation depending on the material of resin. The resin may be epoxy resin, unsaturated polyester, urethane resin, PPS resin, PBT resin, acrylonitrile-butadiene-styrene (ABS) resin. When containing the filler similarly to the encapsulating resin, this resin can improve heat dissipation.

<Fourth Embodiment>

The reactors according to the first to third embodiments can be utilized as components of converters installed on vehicles and the like, for example, or components of power conversion devices provided with the converters.

Figure 6:
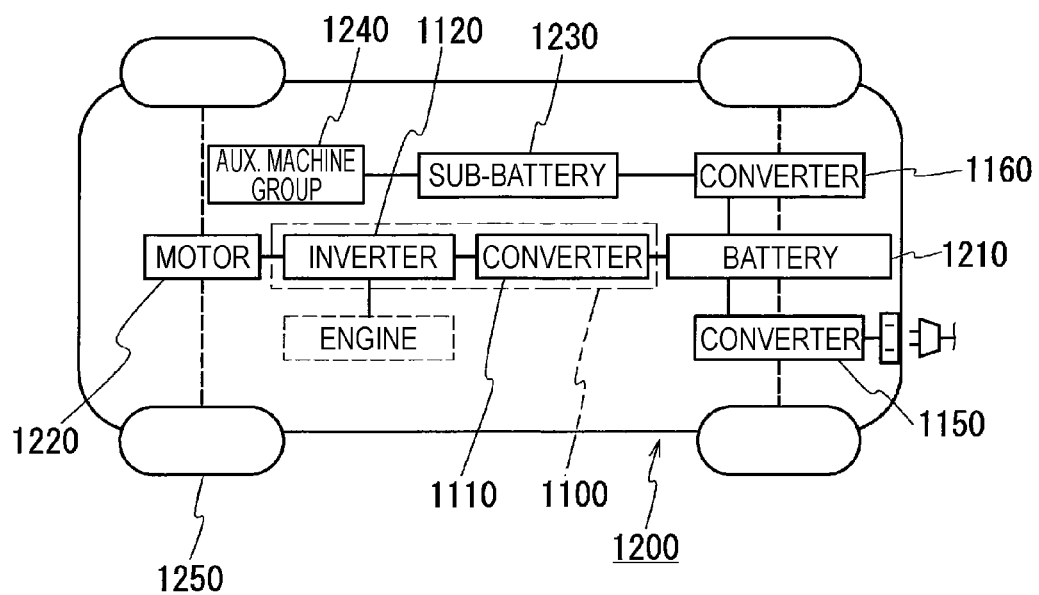
FIG. 6 is a schematic structural view schematically showing a power source system of a hybrid automobile.

For example, as shown in FIG. 6, a vehicle 1200 such as a hybrid automobile or electric vehicle is provided with a main battery 1210, a power conversion device 1100 connected to the main battery 1210, and a motor (load) 1220 which is driven by an electric power from the main battery 1210 and utilized for running. The motor 1220 is typically a three-phase alternating current motor, drives wheels 1250 for running, and serves as a power generator for regeneration. In case of a hybrid automobile, the vehicle 1200 is provided with an engine in addition to the motor 1220. FIG. 6 shows an inlet as a portion for charging the vehicle 1200, which can be provided with a plug.

The power conversion device 1100 is provided with a converter 1110 connected to the main battery 1210, and an inverter which is connected to the converter 1110 and performs DC/AC conversion. When the vehicle 1200 runs, the converter 1110 shown in this example boosts the DC voltage (input voltage) of the main battery 1210 by 200V to 300V, to about 400 V to 700 V and supplies this electric power to the inverter 1120. The converter 1110 decreases the DC voltage (input voltage) output via the inverter 1120 from the motor 1220 down to the DC voltage adapted to the main battery 1210, and charges electricity in the main battery 1210. The inverter 1120 converts the DC boosted at the converter 1110 into a predetermined AC and supplies electric power to the motor 1220 for running the vehicle 1200, and converts the AC output from the motor 1220 into DC and outputs to the converter 1110 for the regeneration.

Figure 7:
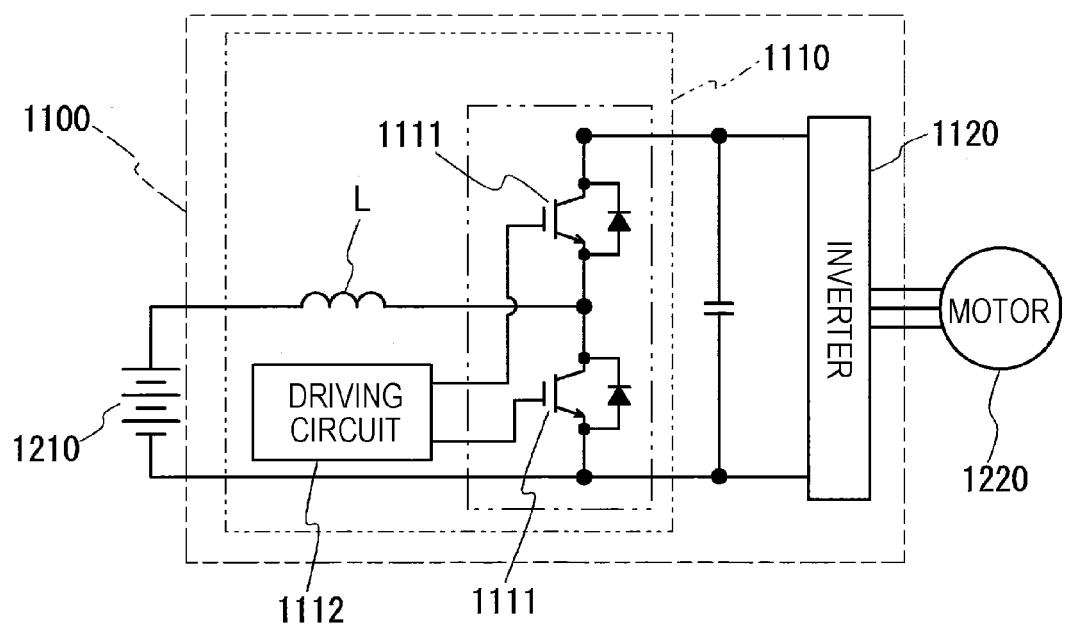
FIG. 7 is a schematic circuit diagram showing one example of a power conversion device according to a fourth embodiment provided with a converter according to the fourth embodiment.

As shown in FIG. 7, the converter 1110 is provided with a plurality of switching elements 1111, a driving circuit 1112 for controlling operation of the switching elements 1111, and a reactor L, and performs switch ON/OFF (switching operation) for conversion of the input voltage (herein, boosting and decreasing voltage). Power devices such as field effect transistor (FET) and insulated gate bipolar transistor (IGBT) are utilized for the switching elements 1111. The reactor L utilizes the coil properties to prevent fluctuation in the electric current flowing through circuits, and serves to smooth the fluctuation in the electric current caused by the switching operation. The reactor according to the first to third embodiments described above is provided as the reactor L. With the reactor 1 exhibiting superior heat dissipation and insulation as well as superior productivity, and the like, the power conversion device 1100 and the converter 1110 can exhibit superior heat dissipation and insulation as well as superior productivity.

In addition to the converter 1110, the vehicle 1200 is provided with a converter 1150 for the auxiliary machine power source, which is connected to the main battery 1210, for an electric supplying device; and a converter 1160, which is connected to a sub-battery 1230 serving as a driving source of an auxiliary machine group 1240 and the main battery 1210 and converts high voltage of the main battery 1210 into low voltage. The converter 1110 typically performs DC-DC conversion, while the converter 1150 for the electric supplying device and the converter 1160 for the auxiliary machine power source performs AC-DC conversion. The converter 1150 for the electric supplying device may also perform DC-DC conversion. The reactors of the converter 1150 for the electric supplying device and the converter 1160 for the auxiliary machine power source can have the same configuration as those of the above reactors according to first to third embodiments. It is possible to utilize the reactors with appropriately modified dimensions and sizes. It is also possible to utilize the above reactors according to first to third embodiments, for converters which perform conversion of input electric power, converters only boosting voltage or converters only decreasing voltage.

The present disclosure is not limited to the above embodiments, and it is possible to appropriately modify without departing from the scope of the disclosure. For example, the sensor can be fixed by the sensor holder and disposed in the trapezoidal space surrounded by the rounded corner portions of the coil elements in the bottom side of the reactor.

INDUSTRIAL APPLICABILITY

The reactor of the present disclosure can be preferably utilized as a component of power conversion devices and various converters, such as converters (typically, DC-DC converter) to be installed on vehicles including hybrid automobiles, plug-in hybrid automobiles, electric automobiles, fuel cell automobiles, and converters for air conditioners.

FIG. 6
1110 Converter
1120 Inverter
1150 Converter
1160 Converter
1210 Main battery
1220 Motor
1230 Sub-battery
1240 Auxiliary machine group Engine
FIG. 7
1112 Device driving circuit
1120 Inverter
1220 Motor

The invention claimed is:

1. A reactor comprising:
a coil with a pair of coil elements connected to each other,
a magnetic core with a pair of interior core portions disposed inside the coil elements and an exterior core portion which connects the interior core portions to form a closed magnetic path, and
an insulator interposed between the coil and the magnetic core,
wherein the reactor is provided with a sensor for measurement of a physical quantity during operation of the reactor, and a sensor holder which includes a member independent from the insulator and which holds the sensor,
wherein each coil element of the pair of coil elements has a tubular body formed by spirally winding a wire and has an end surface shaped to have rounded corner portions with rounded corners, and the coil elements are disposed in parallel such that axes of the coil elements are disposed in parallel to each other,
wherein the sensor holder is provided with an engaging portion which engages with the insulator to prevent the sensor holder form being detached from the insulator, and
wherein the sensor is disposed, with the sensor holder which is engaged at the engaging portion with the insulator, in a trapezoidal space interposed between the rounded corner portions which are disposed to face each other in the coil elements.

2. The reactor according to claim 1,
wherein the sensor holder is provided with a holding portion covering the sensor, and
wherein the holding portion has a length that is at least a total length, in axial direction, of the sensor.

3. The reactor according to claim 2,
wherein the holding portion covers a portion of a wire connected to the sensor.

4. The reactor according to claim 1,
wherein the sensor holder is provided with a partitioning portion disposed between the coil elements.

5. A converter provided with the reactor according to claim 1.

6. A power conversion device provided with the converter according to claim 5.

* * * * *